(12) United States Patent
Liao

(10) Patent No.: US 11,999,433 B2
(45) Date of Patent: Jun. 4, 2024

(54) BICYCLE CONTROL DEVICE

(71) Applicant: TEKTRO TECHNOLOGY CORPORATION, Sioushuei Township, Changhua County (TW)

(72) Inventor: Bo-Yi Liao, Sioushuei Township (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 0 days.

(21) Appl. No.: 18/073,244

(22) Filed: Dec. 1, 2022

(65) Prior Publication Data
US 2023/0202613 A1    Jun. 29, 2023

(30) Foreign Application Priority Data
Dec. 29, 2021   (TW) ................................. 110149357

(51) Int. Cl.
*B62K 23/06*    (2006.01)
*B62M 25/08*    (2006.01)

(52) U.S. Cl.
CPC ............. *B62K 23/06* (2013.01); *B62M 25/08* (2013.01)

(58) Field of Classification Search
CPC ............................... B62K 23/06; B62M 25/08
See application file for complete search history.

(56) References Cited

U.S. PATENT DOCUMENTS

| | | | | |
|---|---|---|---|---|
| 2007/0137361 A1* | 6/2007 | Fujii | ...................... | B62K 23/06 74/473.13 |
| 2013/0032000 A1* | 2/2013 | Miki | ...................... | B62K 23/06 74/491 |

* cited by examiner

*Primary Examiner* — Randell J Krug
(74) *Attorney, Agent, or Firm* — Maschoff Brennan

(57) ABSTRACT

A bicycle control device is configured to be mounted on a handlebar and control a bicycle component. The bicycle control device includes a casing, a first switch assembly and a first lever. The casing is configured to be mounted on the handlebar and having an accommodation space. The first switch assembly is disposed in the accommodation space of the casing and configured to be electrically connected to the bicycle component. The first lever is pivotally disposed on the casing so as to be pivotable along a first direction to activate the first switch assembly and be pivotable along a second direction opposite to the first direction to activate the first switch assembly.

11 Claims, 7 Drawing Sheets

BICYCLE CONTROL DEVICE

CROSS-REFERENCE TO RELATED APPLICATIONS

This non-provisional application claims priority under 35 U.S.C. § 119(a) on Patent Application No(s). 110149357 filed in Taiwan, R.O.C. on Dec. 29, 2021, and the entire contents of which are hereby incorporated by reference.

Technical Field

The disclosure provides a control device, more particularly to a bicycle control device.

Background

In recent years, road bikes, mountain bikes and other types of bicycles are all popular in the market, and it motivates bicycle manufacturers to pay more attention on improving their products.

In a conventional bike, a control device with a lever is used to control a bicycle component (e.g., a derailleur), and the lever can be operated only in a single direction, but such operation direction of the lever may not satisfy various habits of all users, which causes inconvenient operations for some users. Therefore, how to solve the aforementioned issue is one of the crucial topics in this field.

SUMMARY

The disclosure provides a bicycle control device that can be comfortably operated by users with different operating habits.

One embodiment of the disclosure provides a bicycle control device. The bicycle control device is configured to be mounted on a handlebar and control a bicycle component. The bicycle control device includes a casing, a first switch assembly and a first lever. The casing is configured to be mounted on the handlebar and having an accommodation space. The first switch assembly is disposed in the accommodation space of the casing and configured to be electrically connected to the bicycle component. The first lever is pivotally disposed on the casing so as to be pivotable along a first direction to activate the first switch assembly and be pivotable along a second direction opposite to the first direction to activate the first switch assembly.

According to the bicycle control device as disclosed in the above embodiment, the first switch assembly can be activated by pivoting the first lever along the first direction or the second direction opposite to the first direction, such that the user can choose one of the directions to operate the first lever according to the habit of himself or herself for activating the first switch assembly to control the bicycle component.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
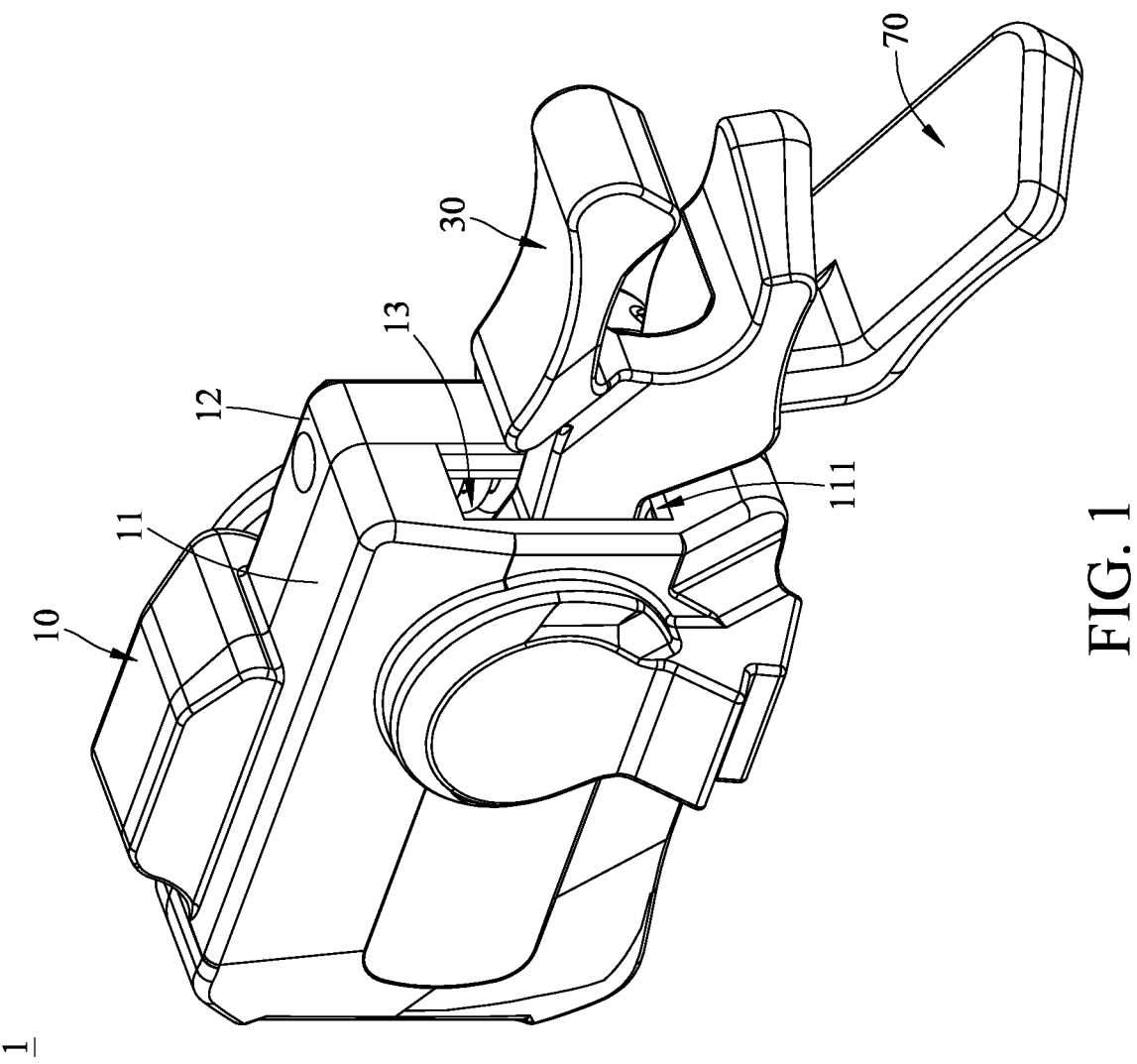
FIG. 1 is a perspective view of a bicycle control device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
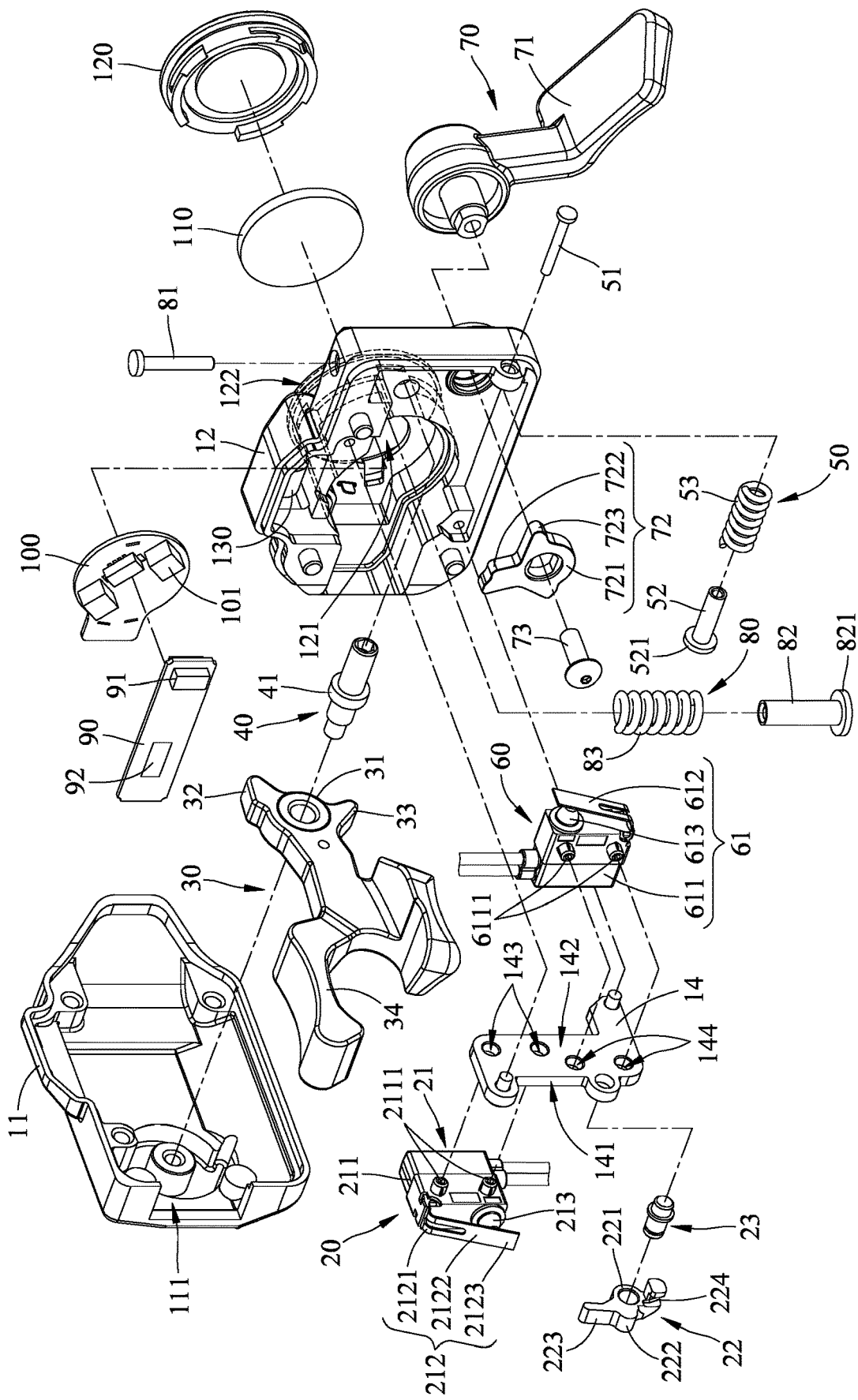
FIG. 2 is an exploded view of the bicycle control device in FIG. 1.
Figure 3:
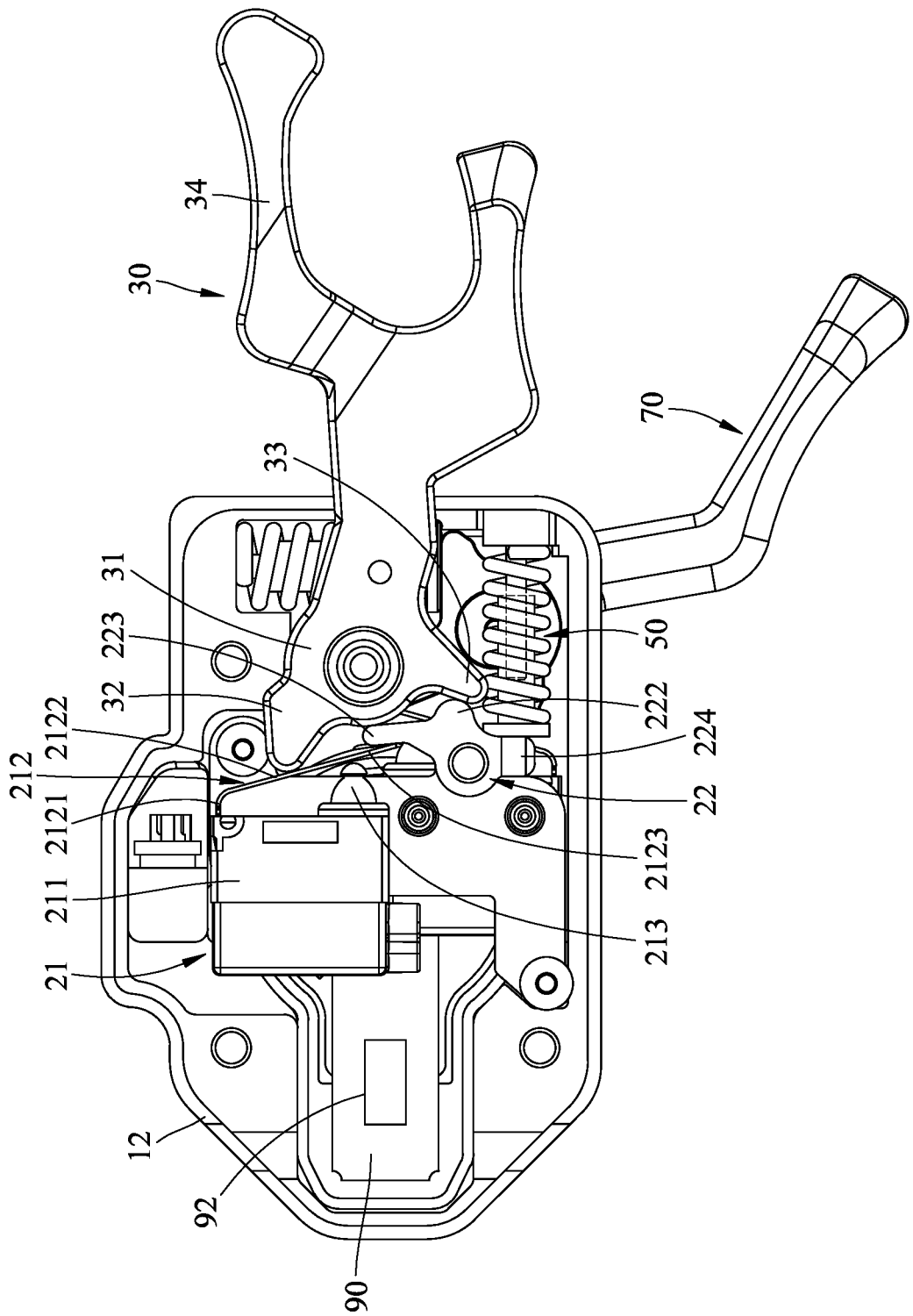
FIG. 3 is a top view of the bicycle control device in FIG. 1 when a first part of a casing of the bicycle control device is removed.
Figure 4:
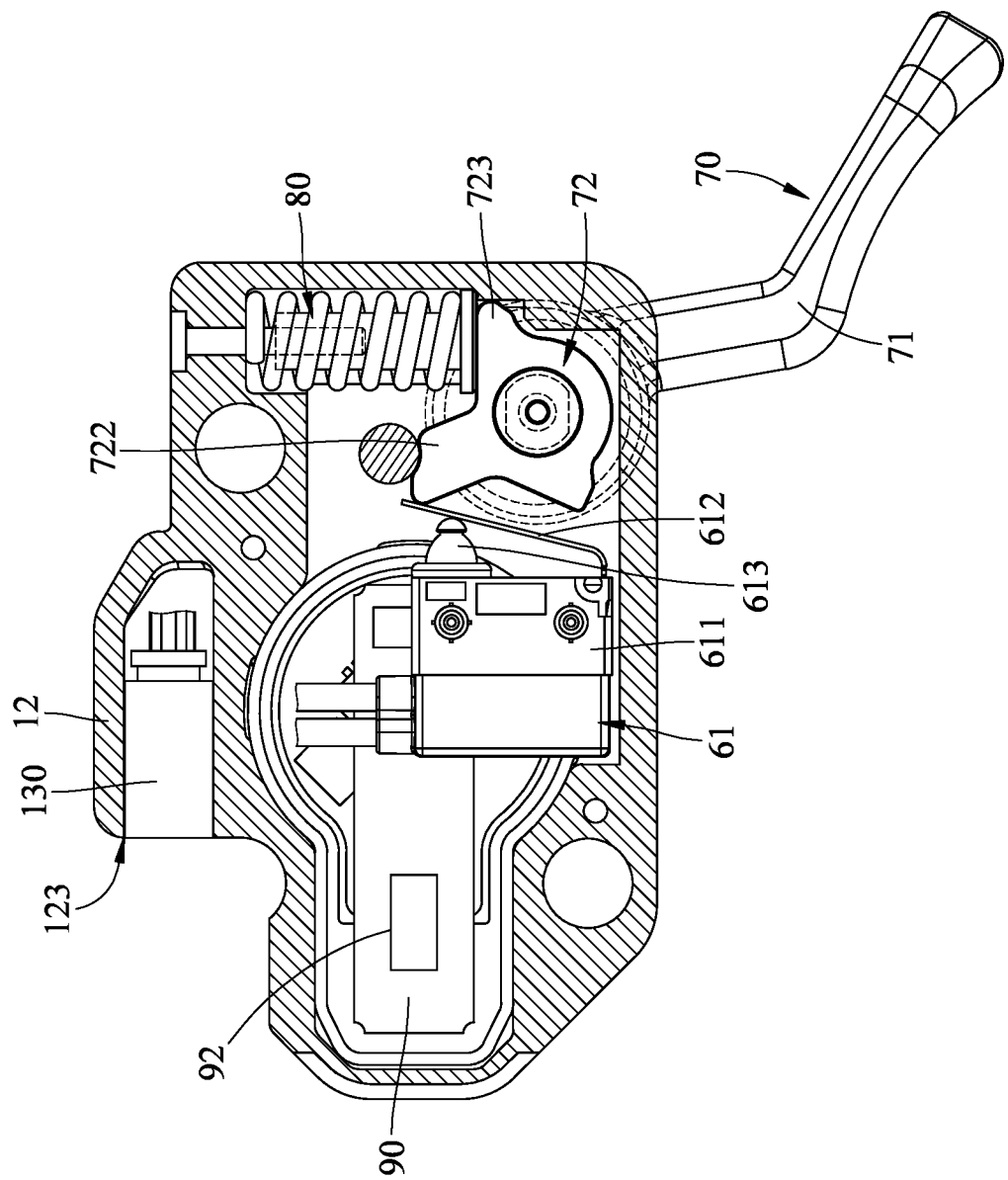
FIG. 4 is a cross-sectional view of the bicycle control device in FIG. 3.

Refer to FIGS. 1 to 4, where FIG. 1 is a perspective view of a bicycle control device 1 according to one embodiment of the disclosure, FIG. 2 is an exploded view of the bicycle control device 1 in FIG. 1, FIG. 3 is a top view of the bicycle control device 1 in FIG. 1 when a first part 11 of a casing 10 of the bicycle control device 1 is removed, and FIG. 4 is a cross-sectional view of the bicycle control device 1 in FIG. 3.

In this embodiment, the bicycle control device 1 is configure to be mounted on a handlebar (not shown) and control a bicycle component (not shown).

The bicycle control device 1 includes a casing 10, a first switch assembly 20 and a first lever 30. The casing 10 is configured to be mounted on the handlebar, and has an accommodation space 13. Specifically, the casing 10 includes a first part 11 and a second part 12. The first part 11 and the second part 12 are assembled with each other via, for example, screws, and the first part 11 and the second part 12 together form the accommodation space 13. In this embodiment, the first part 11 may be fixed to the handlebar via a clamp (not shown).

The first switch assembly 20 is located in the accommodation space 13 of the casing 10. Specifically, the casing 10 may further include a support 14. The support 14 is located in the accommodation space 13 of the casing 10 and fixed to the second part 12 via, for example, screws. The support 14 has a first surface 141, a second surface 142 and two first positioning holes 143. The first surface 141 is located opposite to the second surface 142, and two opposite sides of each of the first positioning holes 143 are respectively located at the first surface 141 and the second surface 142. The first switch assembly 20 includes a first switch 21, and the first switch 21 includes a main body 211, an elastic plate 212 and a pressed component 213. The main body 211 has two first positioning protrusions 2111. The main body 211 is stacked on the first surface 141, and the two first positioning protrusions 2111 are respectively inserted into the two first positioning holes 143, such that the main body 211 is fixed to the support 14. The elastic plate 212 has a fixed portion 2121, a middle portion 2122 and a pressing portion 2123. The fixed portion 2121 is fixed to the main body 211, the middle portion 2122 is located between the fixed portion 2121 and the pressing portion 2123. The middle portion 2122 and the pressing portion 2123 is movable relative to the main body 211, and the pressed component 213 is disposed on the main body 211.

In this embodiment, the main body 211 of the first switch 21 has electronic components (not shown) therein corresponding to the pressed component 213. The pressing portion 2123 of the elastic plate 212 is configured to press the pressed component 213 to force the pressed component 213 to activate the electronic components.

The first lever 30 is pivotally disposed on the casing 10. Specifically, the bicycle control device 1 may further include a shaft 40, and the first lever 30 includes a coupling portion 31, a first pressing portion 32, a second pressing portion 33 and a handle portion 34. The shaft 40 is located in the accommodation space 13 and fixed to the first part 11, and the shaft 40 has a flange 41. The coupling portion 31 of the first lever 30 is pivotally disposed on the first part 11 of the casing 10 via the shaft 40, and the flange 41 is located below the coupling portion 31 so as to support the coupling portion 31. The first pressing portion 32, the second pressing portion 33 and the handle portion 34 respectively protrude from the coupling portion 31 along different directions, and the first pressing portion 32 is in contact with the middle portion 2122 of the elastic plate 212 of the first switch 21. In this embodiment, the first part 11 has a through hole 111 connected to the accommodation space 13, and the handle portion 34 of the first lever 30 sticks out of the casing 10 through the through hole 111 of the first part 11.

In this embodiment, the first switch assembly 20 may further include a rotatable component 22 and a shaft 23, and the rotatable component 22 includes a coupling portion 221, a first pushed portion 222 and a transmission portion 223. The coupling portion 221 is pivotally disposed on the support 14 via the shaft 23. The first pushed portion 222 and the transmission portion 223 protrude from the coupling portion 221 along different directions. The first pushed portion 222 is in contact with the second pressing portion 33 of the first lever 30, and the transmission portion 223 is contact with the pressing portion 2123 of the elastic plate 212.

In this embodiment, the rotatable component 22 may further include a second pushed portion 224, and the second pushed portion 224 protrudes from the coupling portion 221, and the direction that the second pushed portion 224 protrudes from the coupling portion 221 is different from the directions that the first pushed portion 222 and the transmission portion 223 protrude from the coupling portion 221. The bicycle control device 1 may further include an elastic component 50. The elastic component 50 includes a post 51, a movable component 52 and a spring 53. The post 51 is located in the accommodation space 13 of the casing 10 and fixed to the second part 12. The movable component 52 is movably sleeved on the post 51. The movable component 52 has a flange 521. The spring 53 is sleeved on the movable component 52, and two opposite ends of the spring 53 are respectively in contact with the flange 521 and the second part 12. The movable component 52 of the elastic component 50 is in contact with the second pushed portion 224 of the rotatable component 22. The spring 53 of the elastic component 50 forces the first pushed portion 222 of the rotatable component 22 to contact the second pressing portion 33 of the first lever 30 via the movable component 52.

Note that the structure of the elastic component 50 is not restricted in the disclosure; in some other embodiments, the elastic component may be a torsion spring, and the torsion spring may also force the first pushed portion of the rotatable component to constantly contact the second pressing portion of the first lever.

In this embodiment, the bicycle control device 1 may further include a second switch assembly 60 and a second lever 70.

The second switch assembly 60 is located in the accommodation space 13 of the casing 10. Specifically, the support 14 further has two second positioning holes 144. Two opposite sides of each of the second positioning holes 144 are respectively located at the first surface 141 and the second surface 142. The second switch assembly 60 includes a second switch 61, and the second switch 61 includes a main body 611, an elastic plate 612 and a pressed component 613. The main body 611 has two second positioning protrusions 6111. The main body 611 is stacked on the second surface 142, and the two second positioning protrusions 6111 are respectively inserted into the two second positioning holes 144, such that the main body 611 is fixed to the support 14. One end of the elastic plate 612 is fixed to the main body 611, and another end of the elastic plate 612 is movable relative to the main body 611. The pressed component 613 is disposed on the main body 611.

In this embodiment, the main body 611 of the second switch 61 has electronic components (not shown) therein corresponding to the pressed component 613. The elastic plate 612 is configured to press the pressed component 613 to force the pressed component 613 to activate the electronic components.

The second lever 70 is pivotally disposed on the casing 10. Specifically, the second lever 70 includes a handle 71, a pressing component 72 and a shaft 73. The handle 71 is located outside the accommodation space 13 and stacked on the second part 12. The pressing component 72 is located in the accommodation space 13, and the pressing component 72 includes a coupling portion 721, a pressing portion 722 and a pushed portion 723. The shaft 73 is disposed through the coupling portion 721 of the pressing component 72, and the coupling portion 721 and the handle 71 are fixed to the shaft 73. The pressing portion 722 and the pushed portion 723 of the pressing component 72 respectively protrude from the coupling portion 721 along two different directions, and the pressing portion 722 of the pressing component 72 is in contact with the elastic plate 612 of the second switch 61.

In this embodiment, the bicycle control device 1 may further include another elastic component 80. The elastic component 80 includes a post 81, a movable component 82 and a spring 83. The post 81 is located in the accommodation space 13 of the casing 10 and fixed to the second part 12. The movable component 82 is movably sleeved on the post 81, and the movable component 82 has a flange 821. The spring 83 is sleeved on the movable component 82, and two opposite ends of the spring 83 are respectively in contact with the flange 821 and the second part 12. The movable component 82 of the elastic component 80 is in contact with the pushed portion 723 of the pressing component 72. The spring 83 of the elastic component 80 forces the pressing portion 722 of the pressing component 72 to move away from the elastic plate 612 of the second switch 61 via the movable component 82.

Note that the structure of the elastic component 80 is not restricted in the disclosure; in some other embodiments, the elastic component may be a torsion spring, and the torsion spring may also force the pressing portion of the pressing component to move away from the elastic plate of the second switch, such that the pushed portion of the pressing component of the second lever may be omitted.

In this embodiment, the bicycle control device 1 may further include a control circuit board 90, an adaptor circuit board 100, a battery 110 and a battery cover 120. The second part 12 has a battery slot 121 and an opening 122. The battery slot 121 is connected to the accommodation space 13, and the opening 122 is connected to the battery slot 121. The control circuit board 90 and the adaptor circuit board 100 are located in the accommodation space 13 of the casing 10, and the adaptor circuit board 100 is located between the control circuit board 90 and the battery slot 121. The control circuit board 90 has an electrical connector 91, and the adaptor circuit board 100 also has an electrical connector 101. The control circuit board 90 and the adaptor circuit board 100 are electrically connected to each other via a cable (not shown) connected to the electrical connectors 91 and 101. The electronic components in the main body 211 of the first switch 21 and the electronic components in the main body 611 of the second switch 61 are electrically connected to the control circuit board 90 via cables (now shown) welded to the control circuit board 90. The battery 110 is disposed in the battery slot 121 and is electrically connected to the control circuit board 90 via the adaptor circuit board 100. The battery cover 120 is mounted in the opening 122 so as to cover the battery 110. The battery 110 is configured to provide electricity to the control circuit board 90, the first switch 21 and the second switch 61.

In this embodiment, the control circuit board 90, for example, has a wireless signal communication unit 92. The wireless signal communication unit 92 is configured to be in signal communication with the bicycle component via a wireless manner; that is, the wireless signal communication unit 92 can receive signals from the bicycle component or transmit signals to the bicycle component via the wireless manner, but the disclosure is not limited thereto; in some other embodiments, the control circuit board may be in signal communication with the bicycle component via a cable.

In this embodiment, the bicycle component is, for example, a derailleur, such as a front derailleur or a rear derailleur. The bicycle control device 1 is, for example, a shift lever assembly. The first switch 21 is, for example, an upshift switch, and the second switch 61 is, a downshift switch.

When a user desires to upshift the derailleur, the user can operate the first lever 30 to activate the electronic components in the first switch 21, such that the control circuit board 90 enables the derailleur to upshift. The following paragraphs will further introduce the operation of the first lever 30.

As shown in FIG. 3, the first lever 30 is located in an initial position. At this moment, the first lever 30 is not pivoted, and the pressed component 213 is not pressed by the pressing portion 2123 of the elastic plate 212 of the first switch 21, such that the electronic components in the main body 211 of the first switch 21 is in a non-activated state.

Figure 5:
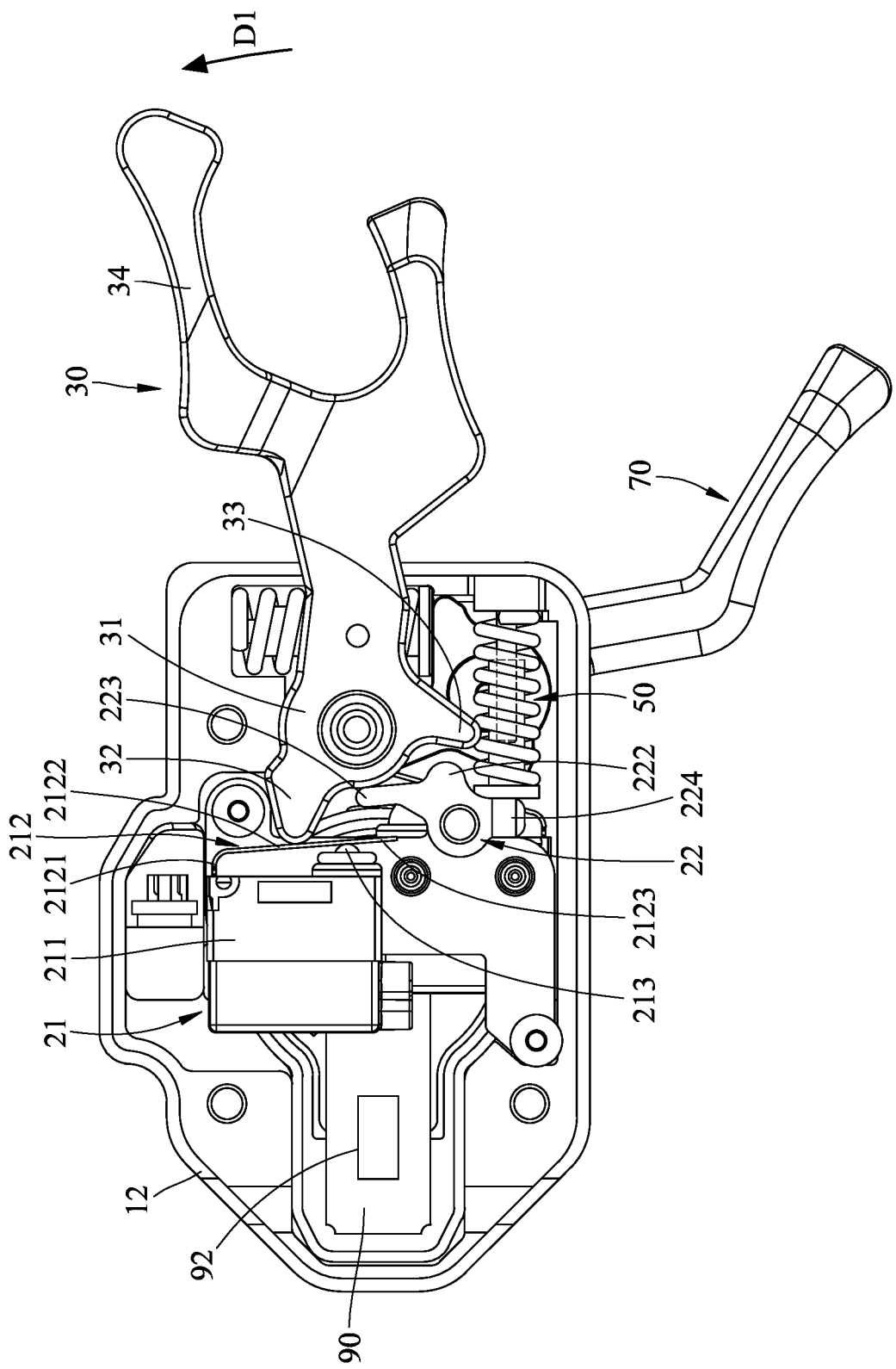
FIG. 5 is a top view of the bicycle control device in FIG. 3 when a first lever of the bicycle control device is pivoted along a first direction.

Then, refer to FIG. 5, where FIG. 5 is a top view of the bicycle control device 1 in FIG. 3 when the first lever 30 of the bicycle control device 1 is pivoted along a first direction D1. When the user desires to upshift the derailleur, the user can operate the handle portion 34 of the first lever 30 along the first direction D1 to pivot the first lever 30 from the initial position to a first activation position. At this moment, the first pressing portion 32 of the first lever 30 presses against the middle portion 2122 of the elastic plate 212 of the first switch 21, such that pressing portion 2123 of the elastic plate 212 presses the pressed component 213 so as to activate the electronic components in the main body 211 of the first switch 21. After the electronic components in the main body 211 of the first switch 21 are activated, the control circuit board 90 transmits an upshift signal to the derailleur via the wireless signal communication unit 92 thereof so as to upshift the derailleur. When the user releases the handle portion 34 of the first lever 30, the elastic plate 212 of the first switch 21 returns to its original position so as to force the first lever 30 to pivot from the first activation position to the initial position.

Figure 6:
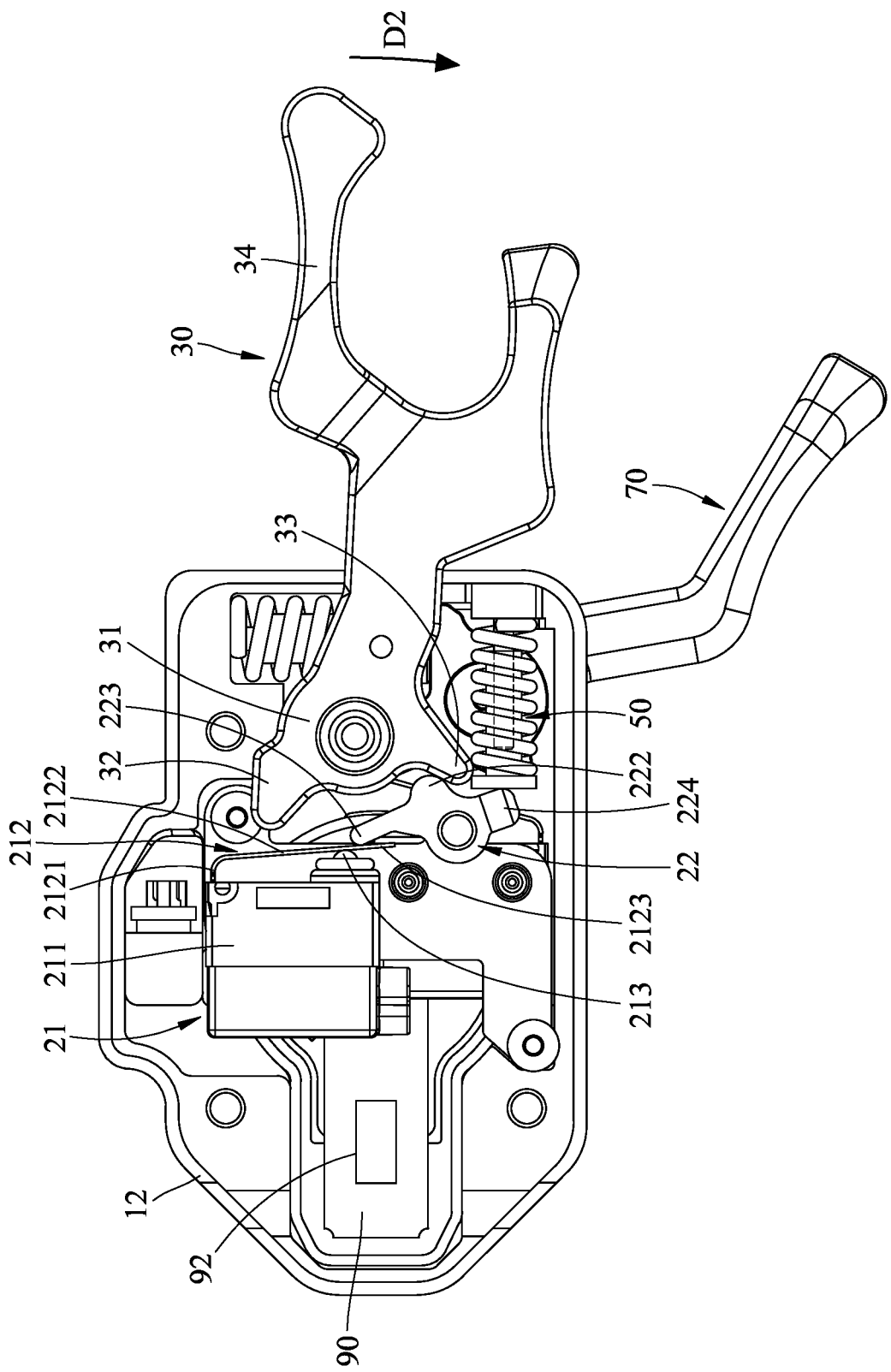
FIG. 6 is a top view of the bicycle control device in FIG. 3 when the first lever of the bicycle control device is pivoted along a second direction.

On the other hand, refer to FIG. 6, where FIG. 6 is a top view of the bicycle control device 1 in FIG. 3 when the first lever 30 of the bicycle control device 1 is pivoted along a second direction D2. The user may operate the handle portion 34 of the first lever 30 along the second direction D2 opposite to the first direction D1 to pivot the first lever 30 from the initial position to a second activation position. At this moment, the second pressing portion 33 of the first lever 30 pushes the first pushed portion 222 of the rotatable component 22, such that the second pushed portion 224 compresses the elastic component 50, and the transmission portion 223 presses against the pressing portion 2123 of the elastic plate 212 of the first switch 21 so as to force the pressing portion 2123 of the elastic plate 212 to press the pressed component 213 and activate the electronic components in the main body 211 of the first switch 21. After the electronic components in the main body 211 of the first switch 21 are activated, the control circuit board 90 transmits the upshift signal to the derailleur via the wireless signal communication unit 92 thereof so as to upshift the derailleur. When the user releases the handle portion 34 of the first lever 30, the elastic plate 212 of the first switch 21 and the elastic component 50 return to their original positions so as to force the first lever 30 to pivot from the second activation position to the initial position.

As shown in FIGS. 5 and 6, the electronic components in the main body 211 of the first switch 21 can be activated by pivoting the first lever 30 along the first direction D1 or the second direction D2 opposite to the first direction D1, such that the user can choose one of the directions D1 and D2 to operate the first lever according to the habit of himself or herself for activating the electronic components in the main body 211 of the first switch 21 to upshift the derailleur.

Moreover, when the first lever 30 is pivoted along the second direction D2, the first lever 30 presses the elastic plate 212 via the rotatable component 22 to activate the electronic components in the main body 211 of the first switch 21. Therefore, there is no need to elongate the elastic plate 212 for enabling the second pressing portion 33 of the first lever 30 to directly press the elastic plate 212, and thus the elastic plate 212 of the first switch 21 can have a relatively short length for ensuring the structural strength while still achieving the activation function.

Note that the rotatable component 22 and the elastic component 50 cooperated with each other are optional components and may be omitted in some other embodiments. In such a configuration, the elastic plate of the first switch may be elongated, or the structure of the second pressing portion of the first lever may be modified for enabling the second pressing portion of the first lever to directly press the elastic plate to force the elastic plate to press the pressed component.

Moreover, the structure of the first lever 30 is not restricted in the disclosure. As long as the first lever can activate the electronic components insides the main body of the first switch when being pivoted along the first direction D1 or the second direction D2, the structure of the first lever may be modified according to actual requirements.

Furthermore, the type of the first switch is not restricted in the disclosure. As long as the first switch can be activated by the first lever pivoted along the first direction D1 or the second direction D2, the first switch may be another suitable type of the switch.

In addition, when the user desires to downshift the derailleur, the user can operate the second lever 70 to activate the electronic components in the main body 611 of the second switch 61, such that the control circuit board 90 enables the derailleur to downshift. The following paragraphs will further introduce the operation of the second lever 70.

As shown in FIG. 4, the second lever 70 is located in an initial position. At this moment, the second lever 70 is not pivoted, and the pressed component 613 is not pressed by the elastic plate 612 of the second switch 61, such that the electronic components in the main body 611 of the second switch 61 is in a non-activated state.

Figure 7:
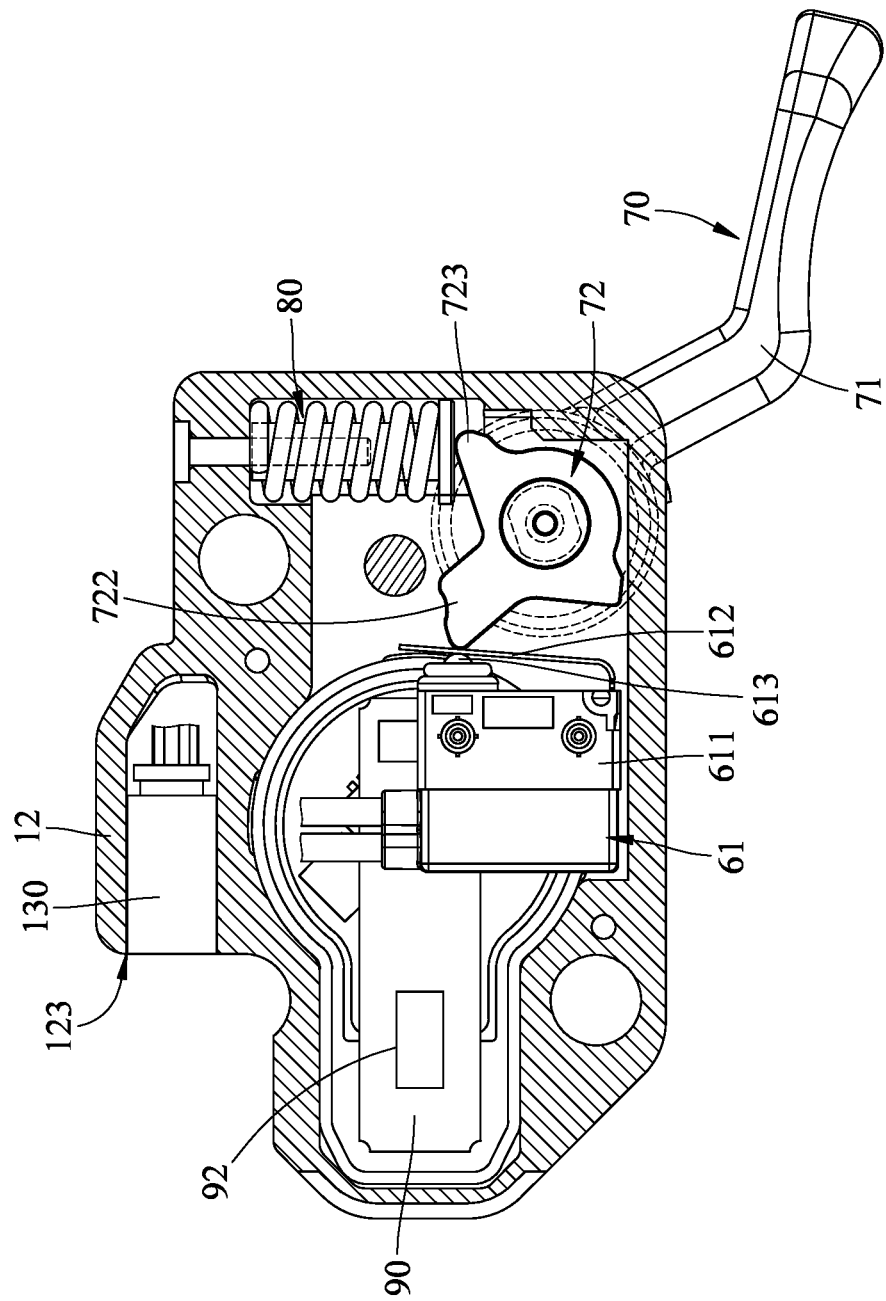
FIG. 7 is a cross-sectional view of the bicycle control device in FIG. 3 when a second lever of the bicycle control device is pivoted.

Specifically, refer to FIG. 7, where FIG. 7 is a cross-sectional view of the bicycle control device 1 in FIG. 3 when the second lever 70 of the bicycle control device 1 is pivoted. When the user desires to downshift the derailleur, the user can operate the handle 71 of the second lever 70 to pivot the second lever 70 from the initial position to an activation position. At this moment, the pushed portion 723 of the pressing component 72 of the second lever 70 compresses the elastic component 80, and the pressing portion 722 of the pressing component 72 of the second lever 70 presses against the elastic plate 612 of the second switch 61, such that the elastic plate 612 presses the pressed component 613 so as to activate the electronic components of the main body 611 of the second switch 61. After the electronic components in the main body 611 of the second switch 61 are activated, the control circuit board 90 transmits the downshift signal to the derailleur via the wireless signal communication unit 92 thereof so as to downshift the derailleur. When the user releases the handle 71 of the second lever 70, the elastic plate 612 of the second switch 61 and the elastic component 80 return to their original positions so as to force the second lever 70 to pivot from the activation position to the initial position.

Note that the structure of the second lever 70 is not restricted in the disclosure. As long as the second lever can activate the electronic components inside the main body of the second switch when being pivoted, the structure of the second lever may be modified according to actual requirements.

Furthermore, the type of the second switch is not restricted in the disclosure. As long as the second switch can be activated by the pivoted second lever, the second switch may be another suitable type of the switch.

Moreover, the first switch 21 is not restricted to being the upshift switch, and the second switch 61 is not restricted to being the downshift switch; in some other embodiments, the first switch may be the downshift switch, and the second switch may be the upshift switch.

On the other hand, the bicycle control device 1 is not restricted to being the shift lever assembly, and the bicycle component is not restricted to being the derailleur; in some other embodiments, the bicycle component may be a direction indicator, and the bicycle control device may be a device for controlling the direction indicator. In another embodiment, the bicycle component may be a seat post, and the bicycle control device may be a device for controlling the seat post. In still another embodiment, the bicycle component may be a suspension, and the bicycle control device may be a device for controlling the suspension.

In addition, the first switch assembly 20 and the second switch assembly 60 of the bicycle control device 1 control two functions (e.g., upshift and downshift) of the bicycle component. However, the second switch assembly 60, the second lever 70 and the elastic component 80 which correspond to the second switch assembly 60 are optional components and may be omitted in some other embodiments. In such a case, although the bicycle control device merely controls one of the two functions of the bicycle component via the first switch assembly, the other of the two functions of the bicycle component may be controlled by a first switch assembly of another bicycle control device or a switch assembly of another suitable device.

Additionally, the control circuit board 90, the battery 110 and the adaptor circuit board 100 are not restricted being disposed in the casing 10; in some other embodiments, the control circuit board, the battery, and the adaptor circuit board may not be disposed in the casing of the bicycle control device, and the control circuit board, the battery and the adaptor circuit board may be disposed in a casing or a device which is separate from the bicycle control device, and thus the battery cover and the battery slot may be omitted, and the control circuit board may be electrically connected to the first switch assembly of the bicycle control device via cables.

In this embodiment, the bicycle control device 1 may further include an expansion connector 130 (as shown in FIG. 4). The expansion connector 130 is disposed in the casing 10 and electrically connected to the control circuit board 90. Specifically, the expansion connector 130 is disposed in the accommodation space 13 of the casing 10 and is exposed to outside via another opening 123 of the second part 12. The expansion connector 130 may be electrically connected to the control circuit board 90 via a cable (not shown) welded to the control circuit board 90. The expansion connector 130 is configured to be electrically connected to an external control switch (not shown) via a cable (not shown) inserted therein. As a result, the external control switch can control the bicycle component via the control circuit board 90. However, the expansion connector 130 is an optional component and may be omitted in some other embodiments.

According to the bicycle control device as disclosed in the above embodiment, the first switch assembly can be activated by pivoting the first lever along the first direction or the second direction opposite to the first direction, such that the user can choose one of the directions to operate the first lever according to the habit of himself or herself for activating the first switch assembly to control the bicycle component.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle control device, configured to be mounted on a handlebar and control a bicycle component, comprising:
   a casing, configured to be mounted on the handlebar and having an accommodation space;
   a first switch assembly, disposed in the accommodation space of the casing and configured to be electrically connected to the bicycle component; and
   a first lever, pivotally disposed on the casing so as to be pivotable along a first direction to activate the first switch assembly and be pivotable along a second direction opposite to the first direction to activate the first switch assembly;
   wherein the first lever comprises a coupling portion, a first pressing portion, a second pressing portion and a handle portion, the coupling portion is pivotally disposed on the casing, the first pressing portion, the second pressing portion and the handle portion respectively protrude from the coupling portion along different directions; when the first lever is pivoted along the first direction, the first pressing portion of the first lever activates the first switch assembly; when the first lever is pivoted along the second direction, the second pressing portion of the first lever activates the first switch assembly.

2. The bicycle control device according to claim 1, wherein the first switch assembly comprises a first switch, the first switch comprises a main body, an elastic plate and a pressed component, the elastic plate has a fixed portion, a middle portion and a pressing portion, the fixed portion is fixed to the main body, the middle portion is located between the fixed portion and the pressing portion, the middle portion and the pressing portion are movable relative to the main body, the pressed component is disposed on the main body; when the first lever is pivoted along the first direction, the first pressing portion of the first lever pushes the middle portion of the elastic plate so as to force the pressing portion of the elastic plate to press the pressed component; when the first lever is pivoted along the second direction, the second pressing portion of the first lever pushes the pressing portion of the elastic plate so as to force the pressing portion of the elastic plate to press the pressed component.

3. The bicycle control device according to claim 2, wherein the first switch assembly further comprises a rotatable component, the rotatable component is located in the accommodation space of the casing and is pivotally disposed on the casing, and the rotatable component is in contact with the second pressing portion of the first lever; when the first lever is pivoted along the second direction, the second pressing portion of the first lever pushes the pressing portion of the elastic plate via the rotatable component.

4. The bicycle control device according to claim 3, wherein the rotatable component comprises a coupling portion, a first pushed portion and a transmission portion, the coupling portion of the rotatable component is pivotally disposed on the casing, the first pushed portion and the transmission portion respectively protrude from the coupling portion of the rotatable component along different directions, the first pushed portion is in contact with the second pressing portion of the first lever, and the transmission portion is in contact with the pressing portion of the elastic plate.

5. The bicycle control device according to claim 3, further comprising an elastic component, wherein the elastic component is disposed on the rotatable component, and the elastic component is configured to force the rotatable component to contact the second pressing portion of the first lever.

6. The bicycle control device according to claim 1, further comprising a second lever and a second switch assembly, wherein the second lever is pivotally disposed on the casing, the second switch assembly is disposed in the accommodation space of the casing and configured to be electrically connected to the bicycle component, and the second lever is pivotable relative to the casing to activate the second switch assembly.

7. The bicycle control device according to claim 6, further comprising an elastic component, wherein the second lever has a pressing portion, the pressing portion of the second lever is configured to activate the second switch assembly, the elastic component is disposed on the second lever, and the elastic component is configured to force the pressing portion of the second lever to move away from the second switch assembly.

8. The bicycle control device according to claim 6, further comprising a control circuit board, wherein the control circuit board is disposed in the accommodation space of the casing, the first switch assembly and the second switch assembly are electrically connected to the control circuit board, and the control circuit board is configured to be electrically connected to the bicycle component.

9. The bicycle control device according to claim 8, further comprising an expansion connector, wherein the expansion connector is disposed on the casing and is electrically connected to the control circuit board.

10. The bicycle control device according to claim 8, further comprising an adaptor circuit board and a battery, wherein the casing further has a battery slot connected to the accommodation space, the adaptor circuit board is located in the accommodation space of the casing and located between the control circuit board and the battery slot, and the battery is disposed in the battery slot and is electrically connected to the control circuit board via the adaptor circuit board.

11. The bicycle control device according to claim 10, further comprising a battery cover, wherein the casing further has an opening connected to the battery slot, and the battery cover is mounted in the opening of the casing and covers the battery.

* * * * *